(12) United States Patent
Brok et al.

(10) Patent No.: US 10,449,942 B2
(45) Date of Patent: Oct. 22, 2019

(54) BRAKE SYSTEM FOR A MOTOR VEHICLE AND METHOD FOR OPERATING A BRAKE SYSTEM

(71) Applicant: AUDI AG, Ingolstadt (DE)

(72) Inventors: Tobias Brok, Kösching (DE); Herbert Ernst, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/816,437

(22) Filed: Nov. 17, 2017

(65) Prior Publication Data

US 2018/0141529 A1 May 24, 2018

(30) Foreign Application Priority Data

Nov. 21, 2016 (DE) ........................ 10 2016 222 845

(51) Int. Cl.
B60T 13/14 (2006.01)
B60T 13/68 (2006.01)
B60T 8/40 (2006.01)

(52) U.S. Cl.
CPC .......... B60T 13/146 (2013.01); B60T 8/4081 (2013.01); B60T 13/686 (2013.01)

(58) Field of Classification Search
CPC ... B60T 13/146; B60T 13/686; B60T 13/4081
See application file for complete search history.

(56) References Cited

U.S. PATENT DOCUMENTS

| 2003/0222497 A1* | 12/2003 | Fey | B60T 7/06 303/113.1 |
| 2004/0080208 A1* | 4/2004 | Giers | B60T 8/36 303/20 |
| 2014/0152085 A1* | 6/2014 | Biller | B60T 8/4081 303/10 |
| 2016/0009263 A1 | 1/2016 | Feigel et al. | |

FOREIGN PATENT DOCUMENTS

| DE | 102012210809 A1 | 1/2013 |
| DE | 102012020322 A1 | 4/2014 |
| DE | 102013224870 A1 | 9/2014 |
| DE | 102014214378 A1 | 1/2016 |

(Continued)

OTHER PUBLICATIONS

German Search Report dated Oct. 10, 2017 of corresponding German application No. 102016222845.5; 9 pgs.

(Continued)

*Primary Examiner* — Vishal R Sahni
(74) *Attorney, Agent, or Firm* — Maier & Maier, PLLC

(57) ABSTRACT

A brake system for a motor vehicle, having a brake pressure source and at least one first wheel brake and at least one second wheel brake, which can be acted on with a brake pressure supplied by the brake pressure source. The first wheel brake is fluidically connected at a first inlet valve and at a first outlet valve, which is fluidically parallel to the first inlet valve, and at a first separating valve via the first inlet valve, and the second wheel brake is fluidically connected at a second inlet valve and at a second outlet valve, which is fluidically parallel to the second inlet valve, and at a second separating valve via the second inlet valve.

10 Claims, 3 Drawing Sheets

(56) References Cited

FOREIGN PATENT DOCUMENTS

KR  10-2014-0131364 A  11/2014
KR  10-2015-0128784 A  11/2015

OTHER PUBLICATIONS

Korean Office Action dated Jan. 4, 2019, in connection with corresponding KR Application No. 10-2017-0155417 (14 pgs., including machine-generated English translation).
Office Action dated Jul. 27, 2019, in corresponding Korean Application No. 10-2017-0155417; 13 pages.

\* cited by examiner

BRAKE SYSTEM FOR A MOTOR VEHICLE AND METHOD FOR OPERATING A BRAKE SYSTEM

FIELD

The invention relates to a brake system for a motor vehicle, having a source of brake pressure and at least one first wheel brake and at least one second wheel brake that can be acted on with a brake pressure supplied by means of the brake pressure source, wherein the first wheel brake is fluidically connected at a first inlet valve and at a first outlet valve, which is fluidically parallel to the first inlet valve, and at a first separating valve via the first inlet valve, and the second wheel brake is fluidically connected at a second inlet valve and at a second outlet valve, which is fluidically parallel to the second inlet valve, and at a second separating valve via the second inlet valve. In addition, the invention relates to a method for operating such a brake system.

BACKGROUND

The brake system serves for decelerating the motor vehicle, thus in this regard, supplying a brake force acting on several wheels of the motor vehicle. The brake force is imposed on the wheels by means of the wheel brakes, i.e., the first wheel brake and the second wheel brake. In this case, the first wheel brake for imposing the brake force is provided on a first of the wheels and the second wheel brake for imposing the brake force is provided on a second of the wheels. If the motor vehicle has more than two wheels, then the brake system preferably has an additional wheel brake for at least one of these other wheels or each one of all the other wheels, by means of which the brake force can also be imposed on the at least one wheel. For example, an actual brake pressure will be applied to the wheel brakes when an operating element is actuated. In this regard, the brake system is present as service brake of the motor vehicle or at least forms a component of the service brake.

The brake system, for example, provides a brake master cylinder, in which a primary brake piston is displaceably arranged. The primary brake piston together with the brake master cylinder limit a reservoir of brake fluid, which is variable, wherein its size depends on the position of the primary brake piston. The primary brake piston is coupled to an operating element, which is present, for example, as brake pedal. By way of the operating element, a driver of the motor vehicle can adjust a desired brake force, which is designated below as pre-specified brake force and is preferably firmly associated with a pre-specified brake pressure.

The brake system is preferably present as an electrohydraulic brake system. This means that the brake fluid present in the brake fluid reservoir supplies, but does not do so directly, the actual brake pressure applied at the first wheel brake and/or second wheel brake when the operating element is actuated, or in any case supplies a part of it, in at least one mode of operation of the brake system. Rather, a target brake pressure is determined when the operating element is actuated, wherein this can be provided with the use of at least one sensor, which is assigned to the operating element and/or to the primary brake piston and/or to the brake master cylinder and/or to a simulator cylinder at which a simulator piston is displaceably arranged.

For example, the sensor can be designed as a displacement sensor or as a pressure sensor. In the first-named case, the actuation range of the operating element by which the operating element is displaced when it is actuated is determined with the use of the sensor. Additionally or alternatively, of course, the pressure present in the brake master cylinder can be determined by means of the sensor. The target brake pressure is subsequently determined from the values that are measured with the use of the sensor, thus, for example, the displacement and/or the pressure. Then an actual brake pressure that corresponds to the target brake pressure is applied or adjusted at the first wheel brake and/or second wheel brake.

In this case, the actual brake pressure is supplied by the brake pressure source, which is present, for example, in the form of a pump, in particular, an electrically operated pump. In the above-described mode of operation of the brake system, in this regard, the brake fluid reservoir is not, or at least is not directly, connected or fluidically connected to the first wheel brake and/or second wheel brake. However, in order to provide haptic feedback to the driver of the motor vehicle when the operating element is actuated, an—optional—brake force simulator is preferably assigned to the brake master cylinder. The latter comprises the simulator piston, which is arranged displaceably in a simulator cylinder and supported at a wall of the simulator cylinder via a spring element, and in this respect is filter-force-loaded.

The simulator piston together with the simulator cylinder limit a simulator fluid reservoir, which is variable, analogous to the brake fluid reservoir, wherein the size of the simulator fluid reservoir depends on the position of the simulator piston. The simulator fluid reservoir is fluidically connected to the brake fluid reservoir. When the operating element is actuated, the brake fluid reservoir is reduced and brake fluid present in the brake fluid reservoir is conveyed to the simulator fluid reservoir. Correspondingly, the simulator fluid reservoir increases, whereby the simulator piston is deflected against the spring force.

Depending on the spring force, which may depend on the deflection of the simulator piston, a counter-force acts on the operating element in the described mode of operation, due to the flow connection between the simulator fluid reservoir and the brake fluid reservoir, and this counter-force is directed against an operating force applied to the operating element by the driver of the motor vehicle. Correspondingly, the driver receives haptic feedback by way of the operating element, and this feedback is essentially dependent on the deflection of the operating element from its initial position or resting position.

To supply a fallback level in case of a defect in the brake system, for example, when a failure of the brake pressure source occurs, preferably a direct flow connection is present between the brake master cylinder and the first wheel brake and/or second wheel brake. In this way, even in case of a defect in the brake system, when the operating element is actuated, an actual brake pressure can be built up at the first wheel brake and/or second wheel brake. For this, however, the driver must apply an essentially greater operating force than usual on the operating element.

The first inlet valve, the first outlet valve, and the first separating valve are fluidically assigned to the first wheel brake. Thus, the first inlet valve and the second outlet valve are each fluidically connected on one side at the first wheel brake. On its side turned away from the first wheel brake, the first inlet valve is connected fluidically at the first separating valve, thus at an output side of the first separating valve.

The input side of the first separating valve, which is fluidically turned away from the wheel brake, is preferably fluidically connected at the brake master cylinder or the brake fluid reservoir, and/or the brake pressure source. The side of the first outlet valve, which is turned away from the first wheel brake, in contrast, is preferably fluidically connected at a supply reservoir, and/or the brake master cylinder, and/or the brake pressure source.

To build up the actual brake pressure at the first wheel brake, the first separating valve and the first inlet valve are opened, so that brake fluid can flow from the brake master cylinder and/or the brake pressure source in the direction of the first wheel brake. After the build-up of the actual brake pressure, the first inlet valve and/or the first separating valve can be closed—when the first outlet valve is closed. Correspondingly, the actual brake pressure of the first wheel brake is kept constant. In order to dissipate the actual brake pressure of the first wheel brake, the first outlet valve is opened. The brake fluid previously guided to the first wheel brake can flow via the latter first outlet valve in the direction of the supply reservoir, the brake master cylinder, and/or the brake pressure source.

The second inlet valve, the second outlet valve, and the second separating valve are assigned to the second wheel brake. The designs for the first wheel brake and the valves assigned to the latter are drawn on analogously for the second wheel brake, wherein the second inlet valve corresponds to the first inlet valve, the second outlet valve corresponds to the first outlet valve, and the second separating valve corresponds to the first separating valve.

SUMMARY

The object of the invention is to propose a brake system for a motor vehicle that has advantages when compared to known brake systems, in particular also makes possible a safe operation of the brake system in case of error, in particular an "operational failure" behavior.

This is achieved according to the invention by a brake system of the disclosure. Here, a first control circuit and a second control circuit that can be operated independently from the first control circuit are provided, wherein the first inlet valve and/or the first outlet valve, and the second separating valve are connected at the first control circuit, and the second inlet valve and/or the second outlet valve are connected at the second control circuit.

The two control circuits, i.e., the first control circuit and the second control circuit, can basically be operated separately from one another, thus completely independently from one another. Preferably, the two control circuits are supplied with electrical current separately from one another, so that, in this regard, a separate power supply is provided for the two control circuits. In this case, it can be more preferably provided that the two control circuits are connected to different current circuits of an on-board network of the motor vehicle, so that even when one of the circuits fails, i.e., one of the control circuits is not functioning, the other one is functional, however.

The two control circuits can basically be assigned to the same electronic control unit (ECU) and correspondingly are present in a common ECU housing. Alternatively, it is possible, of course, to assign the two control circuits to separate ECUs and to correspondingly arrange them in different ECU housings and thus spatially separated. In the latter case, the brake system is particularly fail-safe due to the extensive separation of the control circuits.

The control circuits are connected to different valves of the two wheel brakes, thus to the at least one first wheel brake and to the at least one second wheel brake. Therefore, it is initially provided that the first control circuit is connected to the first inlet valve and/or the first outlet valve, and the second separating valve, and in this regard serves for the operation of the first inlet valve and/or of the first outlet valve, and of the second separating valve. In contrast, the second control circuit is connected to the second inlet valve and/or the second outlet valve, and in this regard serves for operating the second inlet valve and/or the second outlet valve.

Due to the separation of the inlet valves and the outlet valves on the control circuits and the additional assignment of the second separating valve to the first control circuit, a high redundancy is achieved, so that even in the case of failure of one of the control circuits, the functionality of the brake system remains to a great extent. Therefore, in particular, a distribution of brake force between the first wheel brake and the second wheel brake is additionally possible. An ABS functionality is also still maintained. Under certain circumstances, an ESP functionality can also be realized. This is usually dependent, however, on which of the control circuits fails. For example, when one of the control circuits fails, the ESP functionality can be ensured, whereas this is not the case when another of the control circuits fails.

The valves can basically be configured in any way; in particular, each of them can be designed either as a valve opened without current or a valve closed without current. The first separating valve, for example, is thus opened without current or closed without current. Also, the second separating valve can either be opened without current or closed without current. This also applies correspondingly to the inlet valves and the outlet valves. For example, it is provided that the first wheel brake is assigned to a first wheel and the second wheel brake is assigned to a second wheel of the motor vehicle, wherein the first wheel is a front wheel, thus is present on a front axle of the motor vehicle, while on the other hand, the second wheel is designed as a rear wheel and is disposed correspondingly on a rear axle of the motor vehicle.

Another embodiment of the invention provides that the first inlet valve and the first outlet valve are connected at the first control circuit, and the second inlet valve and the second outlet valve are connected at the second control circuit. The above statements shall now be made concrete in that the two valves connected directly at the first wheel brake, namely the first inlet valve and the first outlet valve, shall be connected at the first control circuit. Analogously to this, the two valves directly connected at the second wheel brake, thus the second inlet valve and the second outlet valve, are connected at the second control circuit. The valves of the two wheel brakes provided for the pressure build-up and the pressure dissipation in this regard are controlled by means of different control circuits and are connected to the latter for this purpose.

In the scope of a preferred embodiment of the invention, it is provided that the second separating valve is connected at the first control circuit, and the first separating valve is connected at the second control circuit. This is particularly provided in combination with the above-mentioned embodiment, that the first inlet valve and the first outlet valve are connected at the first control circuit, and the second inlet valve and the second outlet valve are connected at the second control circuit. In summary, therefore, the first inlet valve, the first outlet valve, and the second separating valve shall be actuatable by means of the first control circuit, and the second inlet valve, the second outlet valve, and the first separating valve shall be actuatable by means of the second control circuit, for which purpose they are connected to the respective control circuit.

An enhancement of the invention provides that the first outlet valve, the second outlet valve, the first separating valve, and the second separating valve are connected at the first control circuit, and the first inlet valve and the second inlet valve are connected at the second control circuit. In other words, all outlet valves and all separating valves of the wheel brakes shall be actuated by means of the first control circuit, while in contrast, an actuation of all inlet valves will be provided by means of the second control circuit. Preferably, such an embodiment is provided as an alternative to the one described above.

Basically, a brake system for a motor vehicle is thus present that has a source of brake pressure and at least one first wheel brake and at least one second wheel brake that can be acted on with a brake pressure supplied by means of the brake pressure source, wherein the first wheel brake is fluidically connected at a first inlet valve and at a first outlet valve, which is fluidically parallel to the first inlet valve, and at a first separating valve via the first inlet valve, and the second wheel brake is connected fluidically at a second inlet valve and at a second outlet valve, which is fluidically parallel to the second inlet valve, and at a second separating valve via the second inlet valve. Here, a first control circuit and a second control circuit that can be operated independently from the first control circuit are provided.

Now, for example, two different embodiments of the brake system are to be distinguished. In a first embodiment, it is provided that the first inlet valve and the first outlet valve and the second separating valve are connected at the first control circuit, and the second inlet valve and the second outlet valve and the first separating valve are connected at the second control circuit. In contrast, in a second embodiment it is provided that the first outlet valve, the second outlet valve, the first separating valve, and the second separating valve are connected at the first control circuit, and the first inlet valve and the second inlet valve are connected at the second control circuit.

Another embodiment of the invention provides that the valves connected at one of the control circuits are each separated by circuit technology from the other of the control circuits. In other words, each of the valves is exclusively actuatable by means of one of the control circuits, but not by means of the other one. This separation of each of the valves from one of the actuation circuits makes possible the reliable continued operation also in case of a defect in one of the control circuits that could lead to disrupting the actuation of the valves by the other (functional) control circuit under certain circumstances. It shall thus be prevented that the actuation of the valves by means of one of the control circuits is adversely affected by the other control circuit.

Another preferred embodiment of the invention provides that the first wheel brake by way of the first separating valve and/or the second wheel brake by way of the second separating valve is/are connectable to a brake master cylinder and/or to the brake pressure source. Such a configuration has already been discussed above. Preferably, the wheel brakes can be connected by way of the respective separating valve to the brake pressure source, but not to the brake master cylinder, or vice versa: they can be connected to the brake master cylinder, but not to the brake pressure source. With the use of the separating valves, in this regard, the wheel brakes can be decoupled fluidically from the brake master cylinder or from the brake pressure source. In the case of the linking of the wheel brakes to the brake pressure source by way of the separating valves, the separating valves are preferably configured to be closed without current, so that in the case of a defect in the brake pressure source, an actuation of the wheel brakes is possible via the brake master cylinder, thus by means of the operating element.

Another preferred embodiment of the invention provides that in addition to the first separating valve, there is present another first separating valve, and/or in addition to the second separating valve, there is present another second separating valve, wherein the first separating valve and the additional first separating valve and/or the second separating valve and the additional second separating valve are joined together fluidically on their output sides fluidically facing the wheel brake. Thus, for example, the first separating valve and the additional first separating valve are joined fluidically or can be joined fluidically to the first wheel brake by way of a common brake fluid line.

This applies analogously to the second separating valve and the additional second separating valve with respect to the second wheel brake. Likewise, if a plurality of first wheel brakes and/or a plurality of second wheel brakes are present, then the first wheel brakes are each connected at the output sides of the first separating valve and of the additional first separating valve or the common brake fluid line. The corresponding situation with respect to the second separating valve and the additional second separating valve applies to the plurality of second wheel brakes.

Another preferred embodiment of the invention provides that the additional first separating valve and/or the additional second separating valve is/are connected on its/their input side fluidically turned away from the wheel brake at the brake master cylinder and/or the brake pressure source. Preferably, in this case, there is a connection at the brake master cylinder. In combination with the preceding statements, a configuration thus results in which the first wheel brake is fluidically connected or at least connectable to the brake pressure source via the first separating valve, and the second wheel brake is fluidically connected or at least connectable to the brake pressure source via the second separating valve, and the first wheel brake is fluidically connected or at least connectable to the brake master cylinder via the additional first separating valve and the second wheel brake is fluidically connected or at least connectable to the brake master cylinder via the additional second separating valve.

Finally, in the scope of another embodiment of the invention, it can be provided that the first wheel brake and the second wheel brake are assigned to wheels of the same track or opposite-lying tracks of the motor vehicle. It was explained above that the first wheel, to which the first wheel brake is assigned, preferably represents a front wheel, and the second wheel, to which the second wheel brake is assigned, represents a rear wheel, or vice versa. In other words, the first wheel brake and the second wheel brake are assigned to wheels of different wheel axles. Also, it is now provided that the two wheel brakes are assigned to wheels of the same track, thus wheels lying one behind the other in the travel direction, or opposite-lying tracks. In the case of opposite-lying tracks, for example, the first wheel is provided on the left and the second wheel is provided on the right of the motor vehicle, or vice versa.

In addition, the invention relates to a method for operating a brake system for a motor vehicle, in particular a brake system according to the above statements, wherein the brake system provides a brake pressure source and at least one first wheel brake and at least one second wheel brake that can be acted on with brake pressure supplied by means of the brake pressure source, wherein the first wheel brake is connected fluidically at a first inlet valve and at a first outlet valve, which is fluidically parallel to the first inlet valve, and at a first separating valve by way of the first inlet valve, and the second wheel brake is connected fluidically at a second inlet valve and at a second outlet valve, which is fluidically parallel to the second inlet valve, and at a second separating valve by way of the second inlet valve. Here, a first control circuit and a second control circuit that is operated independently from the first control circuit are provided, wherein the first inlet valve and/or the first outlet valve, and the second separating valve are connected at the first control circuit, and the second inlet valve and/or the second outlet valve are connected at the second control circuit.

The advantages of such a configuration of the brake system and of a method for the operation thereof have already been explained. Both the brake system as well as the method can be enhanced according to the preceding statements, so that reference will be made thereto in this regard.

It is preferably provided to actuate the named valves separately from one another by means of the respective control circuit and to adjust an actual brake pressure in the wheel brakes to a respective target brake pressure. In this case, also when there is a defect in one of the control circuits, such a setting of the actual brake pressure to the target brake pressure can be produced by corresponding actuation of the valves. This means that the two control circuits operate fully redundantly even though each of the valves is connected at only one of the control circuits, and ensures a reliable and safe operation of the brake system.

BRIEF DESCRIPTION OF THE FIGURES

The invention will be explained in further detail in the following on the basis of the exemplary embodiments shown in the drawings, without resulting in any limitation of the invention. The figures show here.

DETAILED DESCRIPTION OF THE FIGURES

Figure 1:
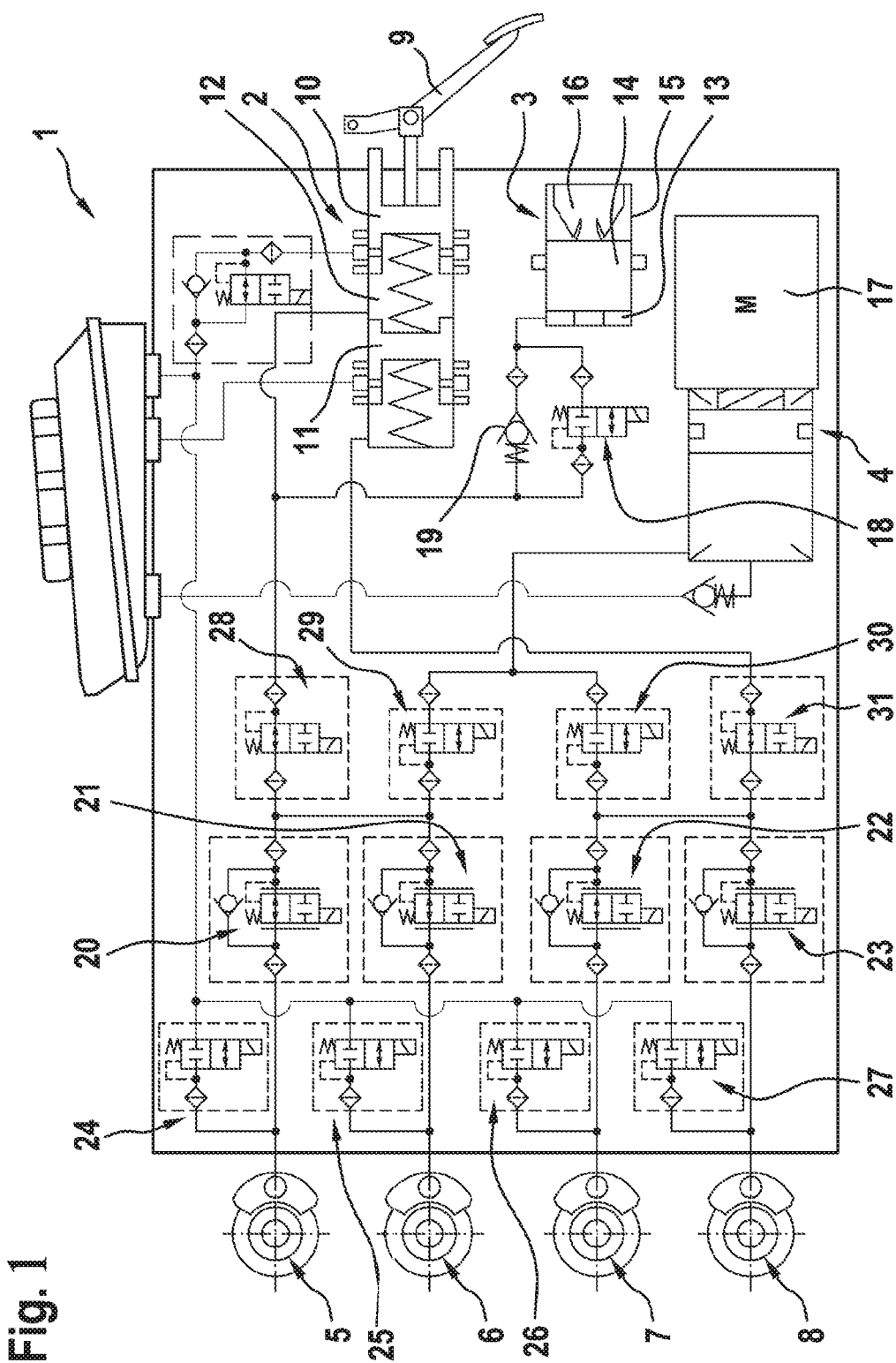
FIG. 1 shows a schematic representation of a brake system for a motor vehicle.

FIG. 1 shows a schematic representation of a brake system 1 for a motor vehicle, which has a brake master cylinder 2, a brake force simulator 3, a brake pressure source 4, and wheel brakes 5, 6, 7 and 8. The number of wheel brakes is arbitrary, of course. In the exemplary embodiment shown here, four wheel brakes 5, 6, 7 and 8 are provided, but a greater or lesser number of wheel brakes can also be present. In the exemplary embodiment shown, the wheel brakes 5 and 7 are assigned to wheels of a first wheel axle, in particular of a front axle, and the wheel brakes 6 and 8 are assigned to a second wheel axle, in particular a rear axle of the motor vehicle.

An operating element 9, which is designed here as a brake pedal, is assigned to the brake master cylinder 2. The operating element 9 is coupled to a primary brake piston 10, for example, by way of a lever-type connection. The primary brake piston 10 is arranged displaceably at the brake master cylinder 2. In the exemplary embodiment shown here, in addition to the primary brake piston 10, another brake piston 11 is arranged in the brake master cylinder 2. This is optional, however.

The primary brake piston 10 together with the brake master cylinder 2 enclose a brake fluid reservoir 12. This reservoir is fluidically connected to a simulator fluid reservoir 13 of the brake force simulator 3. The simulator fluid reservoir 13 is bounded by a simulator piston 14 together with a simulator cylinder 15, in which the simulator piston 14 is arranged displaceably. The simulator piston 14 is preferably acted on by spring force by means of at least one spring element 16. The spring element brings about a spring force on the simulator piston 14, which is directed opposite to an increase in the simulator fluid reservoir 13.

A sensor, which is not shown here and by means of which a target brake pressure is determined when the operating element 9 is actuated, is assigned to the brake master cylinder 2 and/or the operating element 9. After this, an actual brake pressure that corresponds to the target brake pressure and is produced by means of the brake pressure source 4 is applied at the at least one wheel brake 5, 6, 7 and 8. The brake pressure source 4 is preferably configured here as a pump, which is driven or can be driven by means of an electric motor 17.

A switch valve 18 is disposed fluidically between the brake fluid reservoir 12 and the simulator fluid reservoir 13. A non-return valve 19 is arranged fluidically parallel to the switch valve 18. The non-return valve is designed so that it opens in the direction of the wheel brake 5, 6, 7, or 8, thus permitting a flow from the simulator fluid reservoir 13, but preventing a flow back into the simulator fluid reservoir 13.

An operating brake of the motor vehicle is shown with the help of brake system 1. The wheel brakes 5 and 6 are designated as first wheel brakes 5 and 6 in the following, wherein the inlet valves 20 and 21 represent first inlet valves, the outlet valves 24 and 25 represent first outlet valves, the separating valve 29 represents a first separating valve 29, and the separating valve 28 represents an additional first separating valve 28. Analogous to this, the wheel brakes 7 and 8 are designated as second wheel brakes, wherein the inlet valves 22 and 23 are present as second inlet valves 22 and 23, the outlet valves 26 and 27 are present as second outlet valves, the separating valve 30 is present as a second separating valve, and the separating valve 31 is present as an additional second separating valve.

In order to actuate at least several of the named valves, a first control circuit 41 and a second control circuit 42 are provided, but are not shown in FIG. 1. The two control circuits can be operated independently of one another; preferably they are supplied with electrical current separately from one another.

Figure 2:
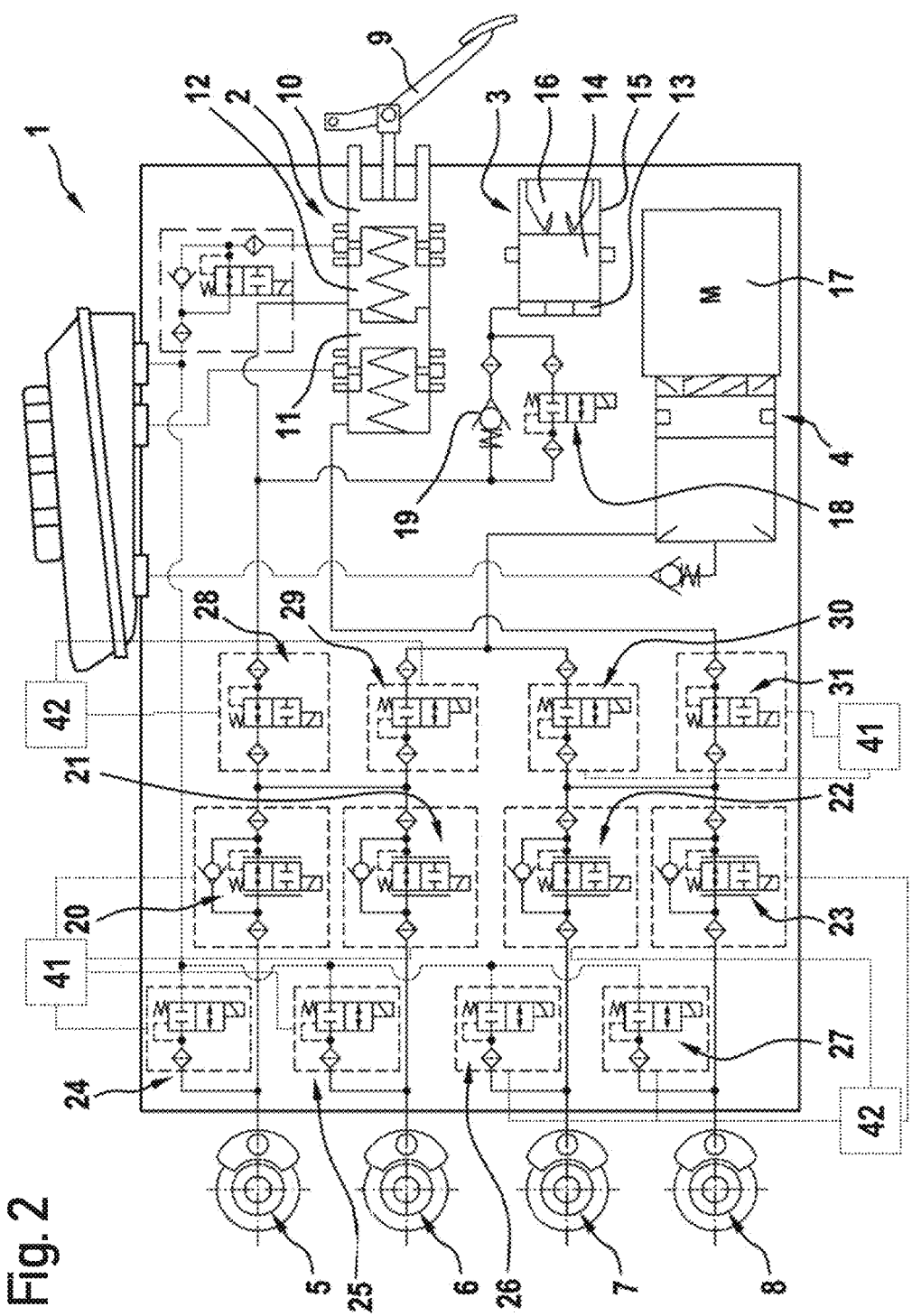
FIG. 2 shows a schematic representation of a brake system for a motor vehicle, showing a first and second control circuit.

In a first configuration, shown in exemplary FIG. 2, the first inlet valves 20 and 21, and the first outlet valves 24 and 25 are connected at the first control circuit 41. In addition, the second separating valve 30 and the additional second separating valve 31 are connected at the first control circuit 41. In contrast, the second inlet valves 22 and 23, and the second outlet valves 26 and 27 are connected at the second control circuit 42. In addition, the first separating valve 29 and the additional first separating valve 28 are connected at the second control circuit 42.

Figure 3:
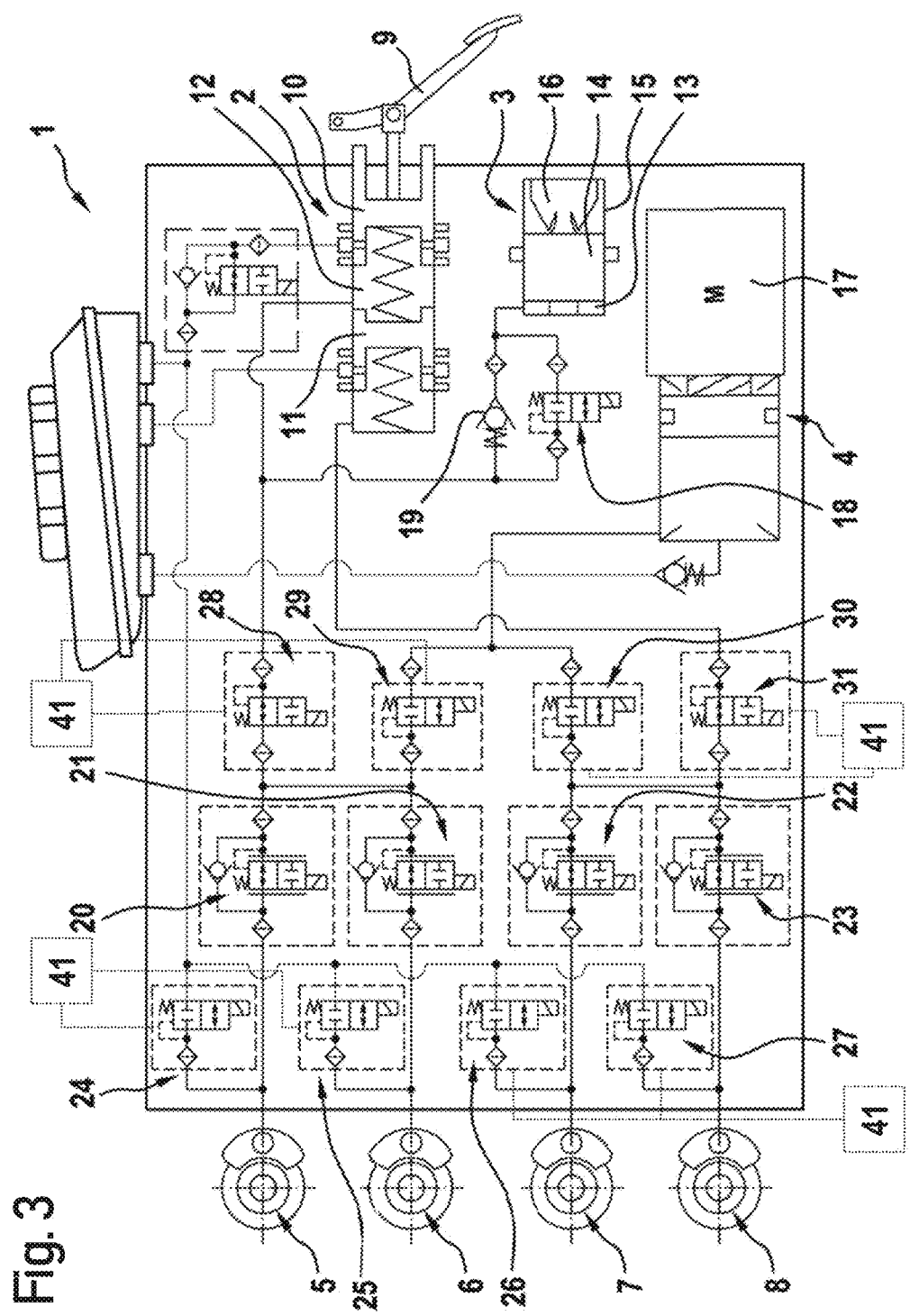
FIG. 3 shows a schematic representation of a brake system for a motor vehicle, showing a first control circuit.

In an alternative configuration shown in FIG. 3, in contrast, it may be provided that the first outlet valves 24 and 25 and the second outlet valves 26 and 27 are connected at the first control circuit 41. In addition, the first separating valve 29, the additional first separating valve 28, the second separating valve 30, and the additional second separating valve 31 are connected at the first control circuit 41.

With such a configuration of the brake system 1, a reliable operation of all wheel brakes 5, 6, 7 and 8 is also possible even in the case of a failure of one of the control circuits, due to corresponding actuation of the valves connected to the latter.

The invention claimed is:

1. A brake system for a motor vehicle, comprising:
a brake pressure source and at least one first wheel brake and at least one second wheel brake, which can be acted on with a brake pressure supplied by the brake pressure source, and
at least one electronic control unit (ECU), the at least one ECU comprising a first electrical control circuit and a second electrical control circuit, each of the first electrical control circuit and the second electrical control circuit being separately supplied with electrical power,
wherein the first wheel brake is fluidically connected at a first inlet valve and at a first outlet valve, which is fluidically parallel to the first inlet valve, and at a first separating valve via the first inlet valve, and the second wheel brake is fluidically connected at a second inlet valve and at a second outlet valve, which is fluidically parallel to the second inlet valve, and at a second separating valve via the second inlet valve, wherein a first electrical control circuit and a second electrical control circuit that can be operated independently from the first electrical control circuit, wherein the first inlet valve and the first outlet valve and the second separating valve are connected at the first electrical control circuit and not the second electrical control circuit, and the second inlet valve and/or the second outlet valve are connected at the second electrical control circuit and not the first electrical control circuit.

2. The brake system according to claim 1, wherein the first inlet valve and the first outlet valve are connected at the first electrical control circuit, and the second inlet valve and the second outlet valve are connected at the second electrical control circuit.

3. The brake system according to claim 1, wherein the second separating valve is connected at the first electrical control circuit, and the first separating valve is connected at the second electrical control circuit.

4. The brake system according to claim 1, wherein the first outlet valve, the second outlet valve, the first separating valve, and the second separating valve are connected at the first electrical control circuit, and the first inlet valve and the second inlet valve are connected at the second electrical control circuit.

5. The brake system according to claim 1, wherein the valves connected at one of the first electrical control circuit or the second electrical control circuit are each separated by circuit technology from the other of the first electrical control circuit or the second electrical control circuit.

6. The brake system according to claim 1, wherein the first wheel brake can be connected via the first separating valve and the second wheel brake can be connected via the second separating valve to a brake master cylinder and to the brake pressure source.

7. The brake system according to claim 1, wherein in addition to the first separating valve, another first separating valve, and in addition to the second separating valve, another second separating valve is present, wherein the first separating valve and the additional first separating valve and the second separating valve and the additional second separating valve are joined together fluidically on their output sides fluidically facing the wheel brake.

8. The brake system according to claim 7, wherein the additional first separating valve and the additional second separating valve are connected on their input side turned away fluidically from the wheel brake at the brake master cylinder and the brake pressure source.

9. The brake system according to claim 1, wherein the first wheel brake and the second wheel brake are assigned to wheels of the same track or of opposite-lying tracks of the motor vehicle.

10. A method for operating a brake system for a motor vehicle, wherein the brake system provides a brake pressure source and at least one first wheel brake and at least one second wheel brake that can be acted on with a brake pressure supplied by the brake pressure source, and
wherein the brake system further provides at least one electronic control unit (ECU), the at least one ECU comprising a first electrical control circuit and a second electrical control circuit, each of the first electrical control circuit and the second electrical control circuit being separately supplied with electrical power;
wherein the first wheel brake is fluidically connected at a first inlet valve and at a first outlet valve, which is fluidically parallel to the first inlet valve, and at a first separating valve via the first inlet valve, and the second wheel brake is fluidically connected at a second inlet valve and at a second outlet valve, which is fluidically parallel to the second inlet valve, and at a second separating valve via the second inlet valve, wherein a first electrical control circuit and a second electrical control circuit operated independently from the first electrical control circuit, wherein the first inlet valve and the first outlet valve and the second separating valve are connected at the first electrical control circuit and not the second electrical control circuit, and the second inlet valve and the second outlet valve are connected at the second electrical control circuit and not the first electrical control circuit.

* * * * *